United States Patent [19]
Jones

[11] 3,893,925
[45] July 8, 1975

[54] OIL SEPARATOR WITH COALESCING MEDIA

[75] Inventor: Loyd W. Jones, Tulsa, Okla.

[73] Assignee: Amoco Production Company, Tulsa, Okla.

[22] Filed: Aug. 16, 1971

[21] Appl. No.: 171,822

[52] U.S. Cl. ............... 210/266; 210/292; 210/307; 55/176
[51] Int. Cl. .......................................... B01d 17/04
[58] Field of Search............. 210/23, 30, 36, 39–42, 210/67, 71, 73, 83, 84, 188, 207–209, 218, 265, 266, 285–287, 289–293, 307, 319, 320, 484, 502, 538–540, DIG. 5, DIG. 21; 55/171–177; 252/328–330, 439

[56] References Cited
UNITED STATES PATENTS

| 509,741 | 11/1893 | Kraker | 210/266 |
| 1,812,629 | 6/1931 | Gifford | 252/330 |
| 1,946,229 | 2/1934 | McMurray | 210/188 X |
| 2,048,140 | 7/1936 | Renfrew et al. | 210/307 X |
| 2,102,796 | 12/1937 | Happel et al. | 252/439 X |
| 3,465,883 | 9/1969 | Jumper | 210/307 |
| 3,469,702 | 9/1969 | Perrin | 210/540 X |
| 3,689,226 | 9/1972 | Stoddard | 210/265 X |

FOREIGN PATENTS OR APPLICATIONS

| 3,036 | 2/1900 | United Kingdom | 210/40 |

Primary Examiner—Thomas G. Wyse
Attorney, Agent, or Firm—John D. Gassett

[57] ABSTRACT

This invention relates to water pollution control and concerns a system for removing dispersed oil from water by contacting the oily water with sulfur to cause the oil to coalesce or agglomerate. A bed of granular sulfur is provided in a vertical tank through which oily water flows downward. An inverted cone shaped member supports the sulfur. This cone shaped member is perforated to permit the passage of fluid but is also provided with unperforated flutes or tapered ridges extending from the base of the cone to its apex. Oil accumulates at the highest level in these tapered ridges and is removed. Oil free water is drawn off at the bottom of the vessel.

9 Claims, 4 Drawing Figures

INVENTOR.
LOYD W. JONES

INVENTOR.
LOYD W. JONES 3,893,925

OIL SEPARATOR WITH COALESCING MEDIA

CROSS REFERENCES TO RELATED APPLICATIONS

This application is closely related to U.S. Patent Application Ser. No. 80,424 entitled "Removing Oil from Waste Water with Sulfur" filed Oct. 13, 1970 now U.S. Pat. No. 3,853,753 and to the recently filed U.S. patent application Ser. No. 170,172 entitled "Dispersed Oil Separator" filed Aug. 9, 1971 now U.S. Pat. No. 3,844,743. The sole inventor in each of these applications is Loyd W. Jones, who is also the inventor of the present application.

BACKGROUND OF THE INVENTION

Field of the Invention

This invention relates to a system for removing dispersed oil from oily water by contacting the oily water with sulfur to cause the oil to coalesce. It partly concerns the system in which the water containing the dispersed oil is flowed downwardly through a vertical vessel containing a bed of granular solid phase yellow sulfur to coalesce the dispersed oil.

Setting of the Invention

In recent years the government and public have become increasingly aware of the need to eliminate pollution of our atmosphere and our water. Industry is moving to minimize these pollution problems both due to a sense of public obligation and to meet legal requirements. Also many of our larger industrial sites are experiencing air pollution problems. It is believed that as a nation the elimination of pollution from our water systems is more urgent.

Many water pollution problems are recognized but a practical solution is not always readily apparent. A particularly troublesome area is the pollution of water by floating and dispersed oil. This problem is nearly always present around oil refineries and oil producing and transportation facilities. Of course there are many ways of removing essentially all oil from oily water. However, such known means which are readily available to the public are either rather expensive or not adaptable to large scale operations.

Many of the oil field waters contain up to about 100 to 500 ppm of oil. This should be reduced to approximately 10 ppm or less if the water is to be dumped into surface streams. If this water is to be injected into an underground reservoir to aid in driving out the oil, as is common in secondary recovery operations, the oil contained should be less than about 10 ppm. The invention described herein teaches an economical way of removing the dispersed oil from water and is a big help in reducing this phase of water pollution.

BRIEF SUMMARY OF THE INVENTION

This invention relates to water pollution control and concerns a system for removing dispersed oil from water by contacting the oily water with sulfur to cause the oil to coalesce or agglomerate. A bed of granular sulfur is provided in a vertical tank through which oily water flows downward. An inverted cone shaped member supports the sulfur. This cone shaped member is perforated to permit the passage of fluid but is also provided with protected channels extending from the base of the cone to an oil gathering chamber at its apex. Oil free water is drawn off at the bottom of the vessel. The oil accumulates in the protected channels and being lighter than water rises to the peak or apex of the cone and is drawn off. The water being heavier than the oil has no tendency to rise but falls downwardly to the bottom of the vessel where it is removed. Both coalescence of the oil droplets and separation of the oil from the water is thus accomplished in a single vessel.

BRIEF DESCRIPTION OF THE DRAWINGS

A better understanding of the invention, various modifications and objects thereof can be made with the following description taken in conjunction with the drawings.

Figure 1:
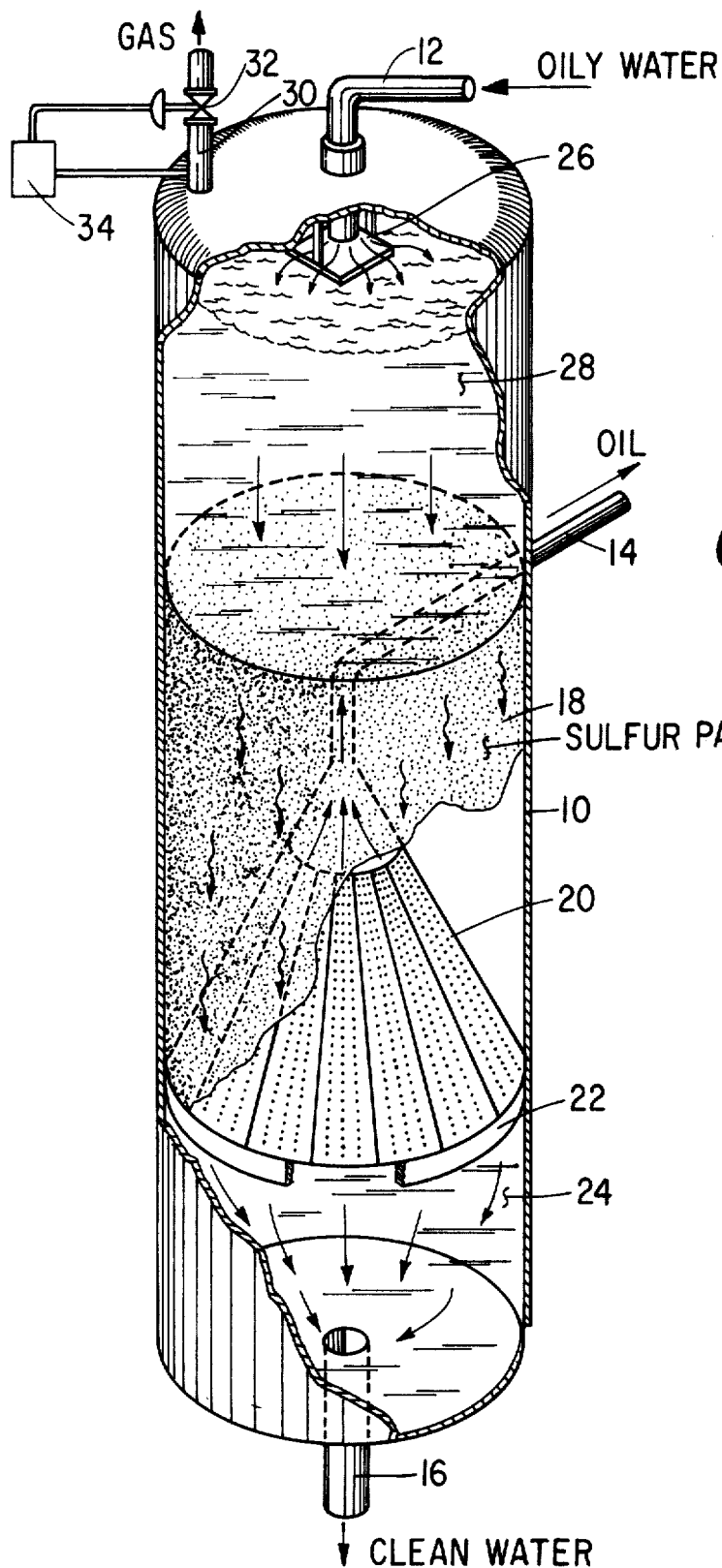
FIG. 1 is a view partly in section and partly isometric of the vertical oil separator of this invention.

Attention is first directed to FIG. 1 which shows a vertical vessel 10 having an oily water inlet 12 at the top, a clean water outlet 16 at the bottom and an oil outlet 14 at an intermediate level along the side thereof. A coalescing medium 18 which is a bed of sulfur particles is supported by an inverted cone support 20. Cone support 20 is supported in vessel 10 by cone support ring 22 having an upperly facing shoulder. Ring 22 is held in position by welding, bolting or any conventional means. As I taught in my said U.S. patent application Ser. No. 80,424 I have discovered that the surface of elemental sulfur is highly efficient as an oil collector. The surface of yellow sulfur is many times, at least three, more efficient in this respect than other forms of sulfur such as white sulfur for example. Yellow sulfur is also many times, at least three, more efficient than other substances such as carbon and straw. The oil-sulfur contact angle of yellow sulfur is apparently very low for most unrefined oils and the adhesive force strong. Visual observations indicate that an oil film on sulfur can increase to a surprising thickness in the presence of flowing oily water such as water containing as little oil as 1 ppm. In contact with sulfur, the oil film appears to be abnormally cohesive. Because of this I construct bed 18 to have a surface area of solid phase yellow sulfur to coalesce the dispersed oil. The purpose of cone support 20 is twofold. First it supports the sulfur particles and secondly it provides protected fluted areas in which the coalesced oil accumulates on the underside of the cone support 20.

As mentioned above, oily water flows inwardly through inlet 12. The oily water is distributed over the vessel by any convenient means such as distribution plate 26 which is supported on the top of the vessel 10. The oily water then collects as at 28 above bed 18. There is a vapor space just above liquid portion 28. Gas can collect in this and is withdrawn through gas outlet 30 which has a valve 32. Valve 32 is opened only when gas accumulates and is controlled by a suitable control 34 which detects when gas has accumulated and opens valve 32 to permit the gas to escape. If gas is no problem, then there is no need for gas outlet 30.

Figure 3:
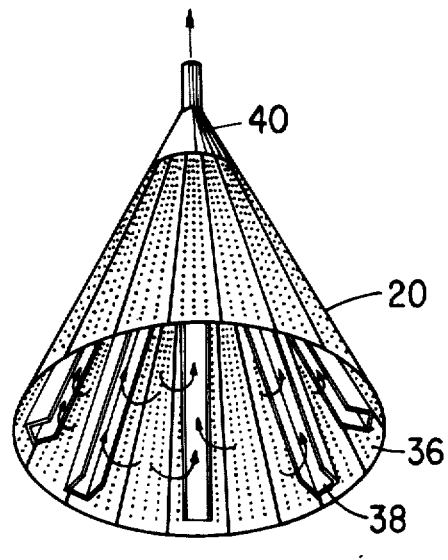
FIG. 3 is an isometric view of one form of the cone support of FIG. 1.

The oily water flows downwardly through bed 18 where the sulfur surface contacts the dispersed oil droplets and causes them to coalesce. By the time the flow of fluids reaches cone 20, the fine drops of oil have all been coalesced. It is here that the separation of the oil and water occurs. Before explaining this it is believed that we should look at FIG. 3. Shown there is cone 20 having perforations 36 and protected channels. One form of protected channels is inverted troughs 38. The troughs 38 are not perforated. The coalesced oil and water flow through perforations 36. Although the exact mechanics of the separation of the oil and water are not known, it appears that the lighter oil is swept into the protected areas of troughs 38 as indicated by the arrows.

The undersides of the channels forms spaces which are protected from the force of the downward flowing water. Coalesced oil emerging from the perforations is subjected to two forces: (1) the force of the downward flowing water and (2) the force of gravity which causes the oil to tend to rise. The water flow sweeps the oil under the channels where it is protected from the downward flow force. Under the channels the floating tendency of the oil causes it to flow upward and collect in chamber 40. The path of least resistance to oil flow is therefore upward through troughs 38 to the apex of cone 20. The oil is then removed through oil outlet 14. The water flows downwardly through space 24 and out through clean water outlet 16.

The vertical thickness of bed 18 measured from the apex of cone 20 to the top of bed 18 should typically be at least about two or three feet, to give good contact time of the sulfur surface and oily water.

The downflow rate through bed 18 is typically in the range of 5–10 gal./min./sq. ft. of surface area at the top of the bed. The most efficient flow rate will depend on many things such as how finely the oil is dispersed in the water and the physical properties of the oil.

I have described the bottom support cone having perforations and flutes or channels in great detail since this design works well with all types of oil that may be dispersed in water. Even oils which have a high specific gravity and which tend to redisperse in water due to relatively low interfacial tension against water can be separated by means of the fluted cone. However, in laboratory model studies of the subject oil separator I have observed evidence which indicates that some oils separate quite readily from the water under the cone even without benefit of the flutes or channels. The tendency of these oils, after passage through the sulfur bed, to separate and float on top of water is so great that they will automatically migrate in an upward direction under the cone whether or not the flutes or channels are present. These oils accumulate under the cone in a coherent mass and are not carried down with the downward flowing water. Therefore my invention can be made to operate with simply a perforated cone support member which does not have the unperforated flutes or channels.

Figure 4:
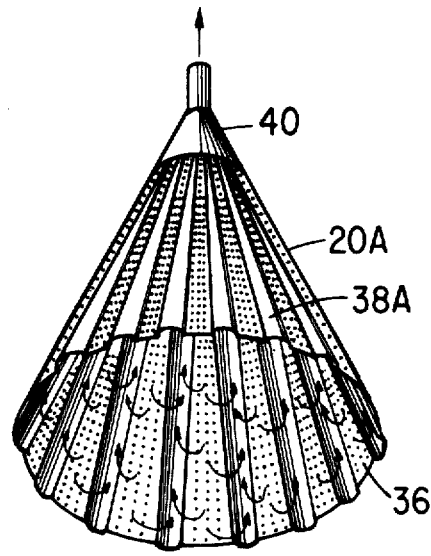
FIG. 4 is an isometric view of still another form of the cone support of FIG. 1.

FIG. 4 shows another modification of cone 20. This cone 20A has perforations 36 and flutes 38A which replaces the troughs 38 in FIG. 3. The flutes 38A are higher or raised from the portion of the cones having holes 36. The oil flows in through perforations 36 and up flutes 38A as indicated by the arrows immediately as the coalesced oil and water flows through perforations 36. For this reason it is considered that the embodiment of FIG. 4 may give better separation than that of FIG. 3.

Figure 2:
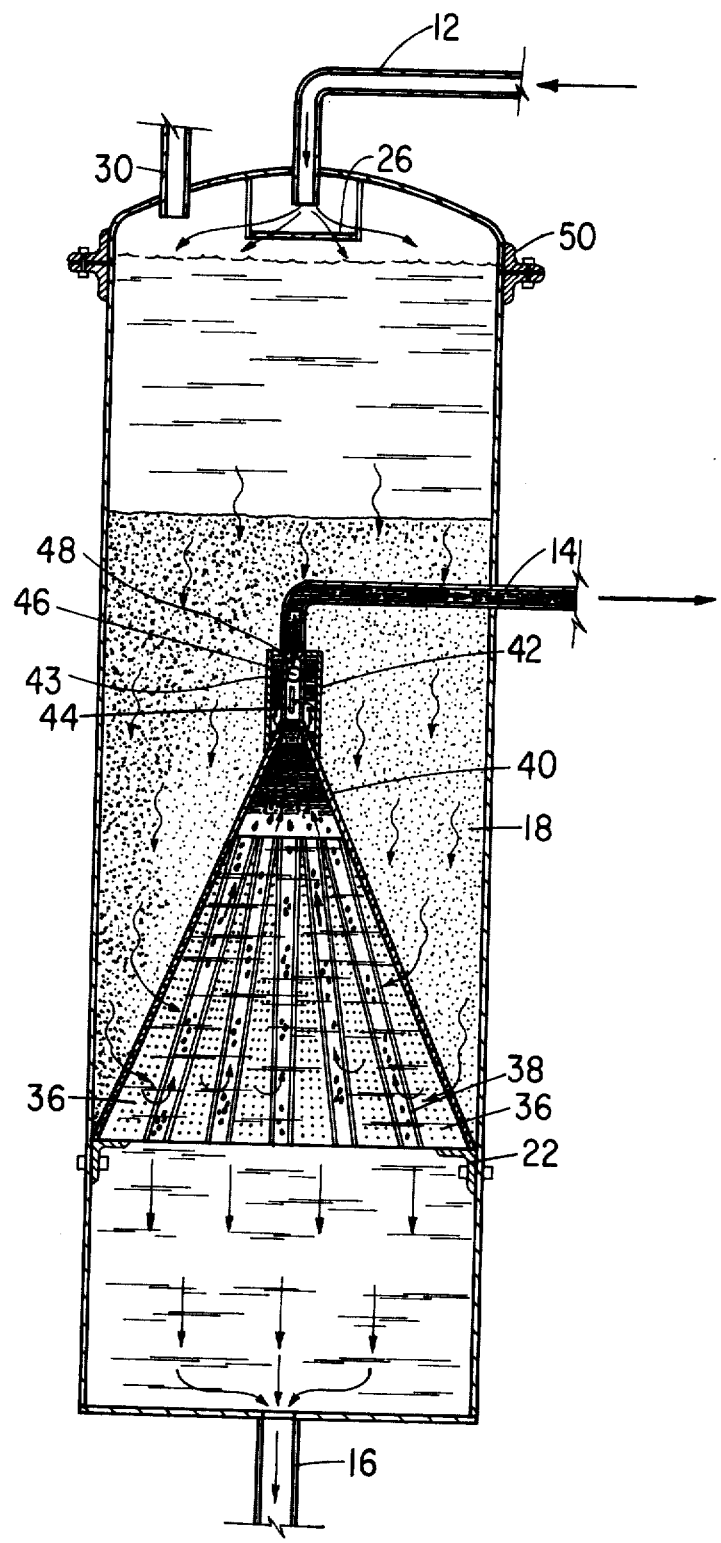
FIG. 2 is a vertical sectional view of the vertical separator of this invention showing a modification of the oil outlet.

Attention is now directed to FIG. 2 which is quite similar to FIG. 1 but is a sectional view and also shows a valving mechanism which permits only oil to flow outwardly through oil outlet 14. The upper apex of cone 20 has no perforations as this forms an oil accumulating chamber 40 which is connected to an oil selection valve means connected to oil outlet 14. The selection valve means includes an outer housing 42, an inner cage 43 having slots 44. A ball valve 46 is in cage 43 and is adapted to seat on seat 48. Ball 46 has a density such that it floats on water but sinks in oil. Thus when oil is in the valve cage 43 ball 46 sinks therein and oil can flow outwardly through outlet 14. On the other hand, if water accumulates in this valve housing then ball 46 is seated against seat 48 and no flow out oil outlet 14 occurs. Other means of permitting only oil to flow out outlet 14 can be used.

There are many advantages to using the embodiment of this invention. For example, the downflow design with the inverted cone collector is most efficient since oil and water are separated immediately as they leave the coalescing bed 18 and no time or space are required for the two phases to travel in the same direction. In upflow arrangements of coalescing beds using crushed sulfur, the upflow tends to lift and expand the sulfur bed. The displaced particles of sulfur tend to release some small oil droplets from the top of the bed. Thus special precautions have to be exercised in using upflow systems. In this downflow design, the lower density of crushed sulfur (compared to sulfur coated sand as described in said U.S. patent application Ser No. 80,424) will not be detrimental as the downflow aids in compressing the sulfur and prevents mechanical attrition of the sulfur particles. The crushed sulfur particles preferably are in the size range of about 2 to 4 mm. Further, gravity will prevent escape of small oil droplets with the water by use of this invention. It is to be noted that crushed sulfur bed can be used in upflow systems but more precautions must be taken than are necessary here.

While the above invention has been described in considerable detail it is possible to make many modifications thereof without departing from the spirit or scope of the invention. For example, while the cone configuration is preferred, the sulfur coalescer bed could be supported by an inclined substantially flat plate having alternate perforations and unperforated channels, flutes, or corrugations. Coalesced oil would collect under the corrugations and travel upward to the upper edge of the inclined support plate in essentially the same manner as described above for the action under the cone. However, collection and draw off of the accumulated oil from such an inclined plate is mechanically more difficult to accomplish than with the more simple cone shaped collector.

I claim:

1. An apparatus for removing finely dispersed oil from oily water which comprises:
   a vessel having an oily water inlet at the top thereof, a water outlet at the bottom, and an oil outlet intermediate said oily water inlet and said water outlet;
   a coalescing particulate bed in said vessel having a surface area of solid phase yellow sulfur;
   a support in and extending across said vessel supporting said bed from below, said support having a sloping surface, said sloping surface having perforations through which all the oily water flows;

at least one protected channel for collecting coalesced oil flowing through said perforations and extending from the lower edge of said sloping surface to the upper edge of said sloping surface, said upper edge being connected to said oil outlet.

2. An apparatus as defined in claim 1 in which said support is an inverted cone member in which there are a plurality of protected channels extending from the lower edge of said cone to its apex which is connected to said oil outlet.

3. An apparatus as defined in claim 2 including valve means connected into said oil outlet which permits flow of oil and stops the flow of water.

4. An apparatus as defined in claim 3 including a gas outlet in the top of said vessel.

5. An apparatus as defined in claim 3 in which said protected channel is an unperforated flute which has a surface raised from the surface of said inverted cone member.

6. An apparatus as defined in claim 5 in which said coalescing bed is crushed sulfur having a particle size of about 2-4 mm.

7. An apparatus as defined in claim 5 including a water dispersing system within said vessel adjacent said only water inlet.

8. A downflow apparatus for removing finely dispersed oil from oily water which comprises:

a vessel having an oily water inlet at the top thereof, a water outlet at the bottom, and an oil outlet intermediate said oily water inlet and said water outlet;

a bed of particles in said vessel having a coalescing effect on oil;

an inverted cone member in and extending across said vessel forming a bottom support for said bed, said inverted cone member being perforated and provided with a plurality of protected channels for collecting coalesced oil and extending from the lower edge of the core members to its apex which is connected to said oil outlet.

9. An apparatus for removing finely dispersed oil from oily water which comprises:

a vessel having an oily water inlet at the top, a water outlet at the bottom, and an oil outlet intermediate said oily water inlet and said water outlet.

a bed of yellow sulfur particles in said vessel;

an inverted cone member in and extending across said vessel supporting said bed above said cone, said cone member having perforations therein through which all the fluid flowing through said bed passes; the interior of said cone member at its apex being connected by a channel to said oil outlet.

* * * * *